United States Patent
Tamaizumi (10) Patent No.: US 7,349,781 B2
(45) Date of Patent: Mar. 25, 2008

(54) ELECTRIC POWER STEERING APPARATUS

(75) Inventor: Terutaka Tamaizumi, Okazaki (JP)

(73) Assignee: JTEKT Corporation, Osaka (JP)

( * ) Notice: Subject to any disclaimer, the term of this patent is extended or adjusted under 35 U.S.C. 154(b) by 169 days.

(21) Appl. No.: 11/407,005

(22) Filed: Apr. 18, 2006

(65) Prior Publication Data
US 2006/0235591 A1    Oct. 19, 2006

(30) Foreign Application Priority Data
Apr. 19, 2005    (JP) ............... 2005-121075

(51) Int. Cl.
*B62D 5/04* (2006.01)

(52) U.S. Cl. ............... 701/42; 701/41; 180/443; 180/446

(58) Field of Classification Search .......... 701/41, 701/42; 180/412, 413, 422, 443, 446
See application file for complete search history.

(56) References Cited

U.S. PATENT DOCUMENTS

| | | | |
|---|---|---|---|
| 5,732,373 A | | 3/1998 | Endo |
| 6,240,350 B1 * | | 5/2001 | Endo ............... 701/41 |
| 6,250,419 B1 * | | 6/2001 | Chabaan et al. ...... 180/443 |
| 6,651,771 B2 * | | 11/2003 | Chabaan ............ 180/446 |
| 6,736,236 B2 * | | 5/2004 | Kurishige et al. ...... 180/446 |
| 6,896,094 B2 * | | 5/2005 | Chabaan ............ 180/446 |
| 2007/0205041 A1 * | | 9/2007 | Nishizaki et al. ..... 180/446 |

FOREIGN PATENT DOCUMENTS

| | | |
|---|---|---|
| DE | 196 15 377 A1 | 10/1996 |
| EP | 1 097 855 A2 | 5/2001 |
| JP | 03-200475 | 9/1991 |

* cited by examiner

*Primary Examiner*—Gary Chin
(74) *Attorney, Agent, or Firm*—Jordan and Hamburg LLP (57) ABSTRACT

The controller in an electric power steering apparatus stores the relationship between the steering torque and the basic assist torque in which the relationship is stored as assist characteristic, and stores the relationship between the steering angle correspondence value corresponding to the steering angle of the vehicle and the motor output correction value in which the relationship is stored as correction characteristic. The controller corrects the output of the motor, which is required in order to generate the basic assist torque, in accordance with the motor output correction value determined from the steering angle correspondence value and correction characteristic, in which the basic assist torque is determined from the steering torque and assist characteristic. The correction characteristic is set so that the denominator in the frequency transfer function $(K_1\theta_p + K_2\theta_p s + K_3\theta_p s^2)/(s^2/\omega_0^2 + 2\zeta_0 s/\omega_0 + 1)$ of the motor output correction value to the steering angle correspondence value has a term which includes the resonance angular frequency of the yaw motion of the vehicle, and a term which includes the damping ratio of the yaw motion of the vehicle.

2 Claims, 7 Drawing Sheets

ELECTRIC POWER STEERING APPARATUS

FIELD OF THE INVENTION

The present invention relates to an electric power steering apparatus which provides steering assist power by means of a motor.

DESCRIPTION OF THE RELATED ART

In an electric power steering apparatus, a relationship between the steering torque and basic assist torque is stored as assist characteristic, and a relationship between the steering angle correspondence value and motor output correction value is stored as correction characteristic. Then, the steering characteristic is optimized by correcting the motor output, which is required in order to generate the basic assist torque corresponding to the steering torque detected by the torque sensor, in accordance with the motor output correction value corresponding to the determined steering angle correspondence value. For example, return steering control in which the steering assist power is set at a greater power in the return steering state than in the positive steering state, damping control in which the convergence of the steering wheel is improved by damping the steering assist power in accordance with the rate of variation in the steering angle, and inertia compensation control in which the effects of the inertia of the motor for generating the steering assist power is compensated by varying the steering assist power in accordance with the steering acceleration have been performed. (see Japanese Patent No. 2949293).

SUMMARY OF THE INVENTION

In the design of a control system used to optimize the steering characteristic, it is necessary to consider not only the characteristic of the electric power steering apparatus but also the characteristic of the vehicle. However, since the characteristic of the electric power steering apparatus and the characteristic of the vehicle affect each other in complex ways, it has not been easy to design the control system for optimizing the steering characteristic. It is an object of the present invention to provide an electric power steering apparatus that can solve such problem.

The feature of the present invention is that the electric power steering apparatus for a vehicle comprises a motor for generating steering assist power, means for determining steering torque, means for storing a relationship between the steering torque and basic assist torque, in which the relationship is stored as assist characteristic, means for determining steering angle correspondence value corresponding to the steering angle of the vehicle, means for storing a relationship between the steering angle correspondence value and motor output correction value, in which the relationship is stored as correction characteristic, and means for correcting the output of the motor, which is required in order to generate the basic assist torque, in accordance with the motor output correction value determined on the basis of the determined steering angle correspondence value and the assist characteristic, in which the basic assist torque is determined on the basis of the determined steering torque and the assist characteristic, wherein the correction characteristic is set so that the denominator in the frequency transfer function of the motor output correction value to the steering angle correspondence value has a term which includes the resonance angular frequency of the yaw motion of the vehicle, and a term which includes the damping ratio of the yaw motion of the vehicle.

It is sufficient if the steering angle correspondence value in the present invention is a value whose amount of variation corresponds to the amount of variation in the steering angle. For example, the steering angle correspondence value can be the amount of operation of a member such as the steering wheel or steering shaft which constitutes the line for transmitting the steering operation of a driver to the vehicle wheels, or the amount of operation of the output shaft of the motor for generating the steering assist power. The correction characteristic can be a characteristic which is set so that the steering characteristic is optimized in accordance with the return steering control, damping control, inertia compensation control or the like.

In order to set the correction characteristic of the output of the motor for generating the steering assist power so that the steering characteristic is optimized, it is desirable to minimize the effect of the behavior of the vehicle due to the variation in the steering angle. Since the yaw motion of the vehicle is generated on the basis of the axial force which acts on the vehicle wheels used for steering in accordance with the variation in the steering angle, such vehicle behavior to the variation in the steering angle can be expressed by a frequency transfer function of the axial force correspondence value acting on the vehicle wheels used for steering to the steering angle correspondence value. The axial force correspondence value can be the axial force which acts on the vehicle wheels used for steering, yaw rate of the vehicle, or lateral acceleration of the vehicle or the like. The denominator in the frequency transfer function of the axial force correspondence value which acts on the vehicle wheels used for steering to such the steering angle correspondence value can be set so that the denominator has a term including the resonance angular frequency of the yaw motion of the vehicle, and a term including the damping ratio of the yaw motion of the vehicle.

In the present invention, the denominator in the frequency transfer function of the motor output correction value to the steering angle correspondence value has a term which includes the resonance angular frequency of the yaw motion of the vehicle, and a term which includes the damping ratio of the yaw motion of the vehicle; accordingly, this denominator can be set so as to agree with the denominator in the frequency transfer function of the axial force correspondence value which acts on the vehicle wheels used for steering to the steering angle correspondence value. As a result, the effect of the vehicle behavior arising due to the variation in the steering angle on the correction characteristic of the output of the motor for generating the steering assist power can be reduced merely by varying the coefficients of the terms of the numerator in the frequency transfer function of the motor output correction value to the steering angle correspondence value. Accordingly, the design of the control system for optimizing the steering characteristic can easily be performed with using the frequency response; furthermore, since all of the terms in this numerator can be manipulated, the degree of freedom in design is increased.

In the present invention, it is preferable that the numerator in the frequency transfer function of the motor output correction value to the steering angle correspondence value includes at least one term among the terms $K_1 \theta_p$, $K_2 \theta_p s$ and $K_3 \theta_p s^2$, where $K_1$ is a return steering control gain, $K_2$ is a damping control gain, $K_3$ is an inertia compensation control gain, $\theta_p$ is the steering angle correspondence value, and s is a Laplace operator, the return steering control gain $K_1$ is set so that the steering assist power is greater in a return steering state than in a positive steering state, the damping control gain $K_2$ is set so that the steering assist power is attenuated in accordance with the rate of variation in the steering angle, and the inertia compensation control gain $K_3$ is set so that the steering assist power is varied in accordance with the acceleration of the variation in the steering angle. As a result, the present invention can be used in the design of a control system which performs the return steering control, damping control or inertia compensation control in order to optimize the steering characteristic.

The electric power steering apparatus of the present invention makes it possible to simplify the design of the control system which is used to optimize the steering characteristic.

DESCRIPTION OF THE PREFERRED EMBODIMENT

Figure 1:
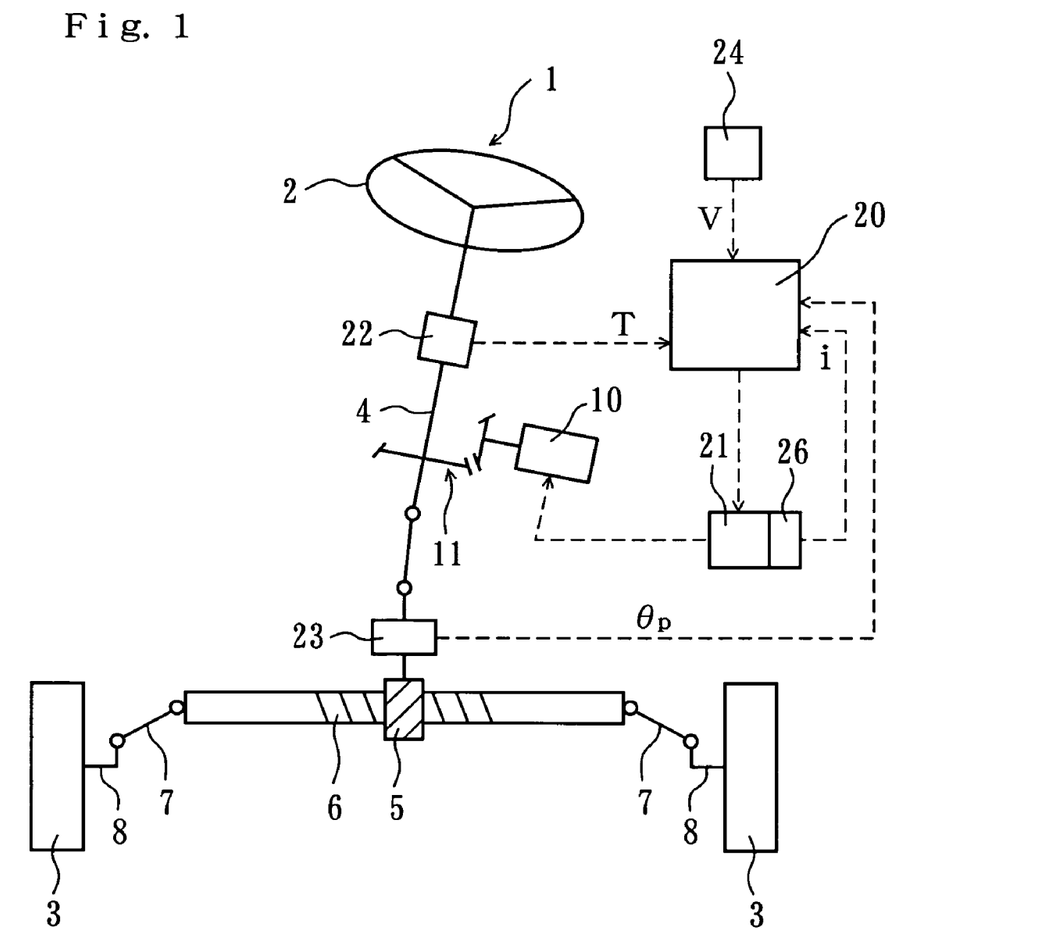
FIG. 1 is a structural explanatory diagram of an electric power steering apparatus constituting an embodiment of the present invention.

The vehicle electric power steering apparatus 1 shown in FIG. 1 comprises a mechanism which transmits the rotation of the steering wheel 2 caused by steering operation to the vehicle wheels 3 used for steering so that the steering angle varies. In the present embodiment, the rotation of the steering wheel 2 is transmitted to a pinion 5 via a steering shaft 4, so that a rack 6 engaged with the pinion 5 moves, and this movement of the rack 6 is transmitted to the vehicle wheels 3 via tie rods 7 and knuckle arms 8 so that the steering angle varies.

A motor 10 is provided for generating steering assist power which acts on the line through which the rotation of the steering wheel 2 caused by the steering operation of the driver is transmitted to the vehicle wheels 3. In the present embodiment, the steering assist power is applied by transmitting the rotation of the output shaft of the motor 10 to the steering shaft 4 via a speed reduction gear mechanism 11.

The motor 10 is connected to a controller 20 constructed from a computer via a driving circuit 21. A torque sensor 22 which determines the steering torque T of the steering wheel 2, a steering angle sensor 23 which determines the rotational angle $\theta_p$ of the pinion 5 as the steering angle correspondence value corresponding to the steering angle of the vehicle, a vehicle speed sensor 24 which determines the vehicle speed V, and a current sensor 26 which determines the driving current i of the motor 10 are connected to the controller 20.

Figure 2:
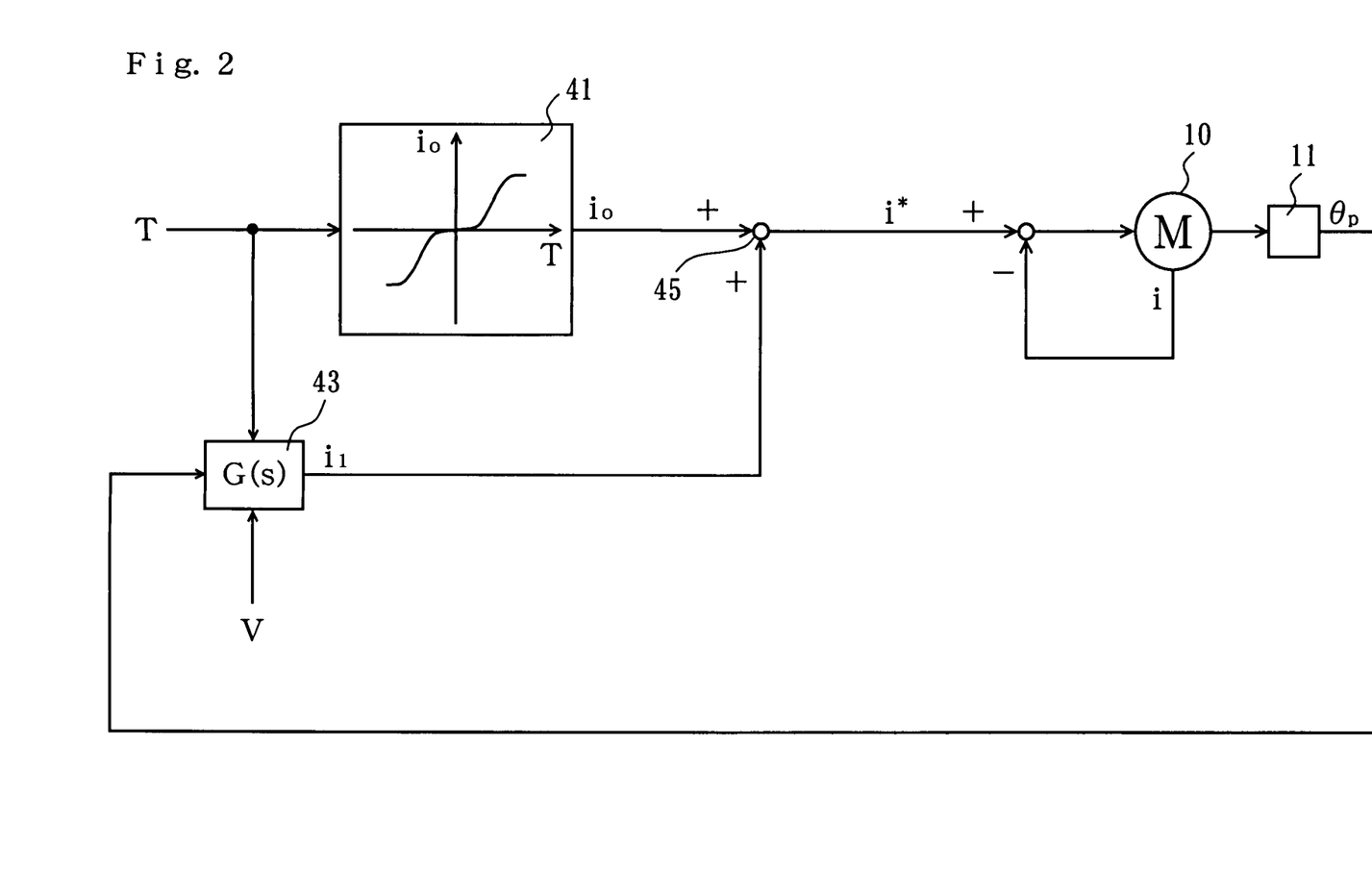
FIG. 2 is a control block diagram of the motor for generating steering assist power in the electric power steering apparatus of the embodiment of the present invention.
Figure 3:
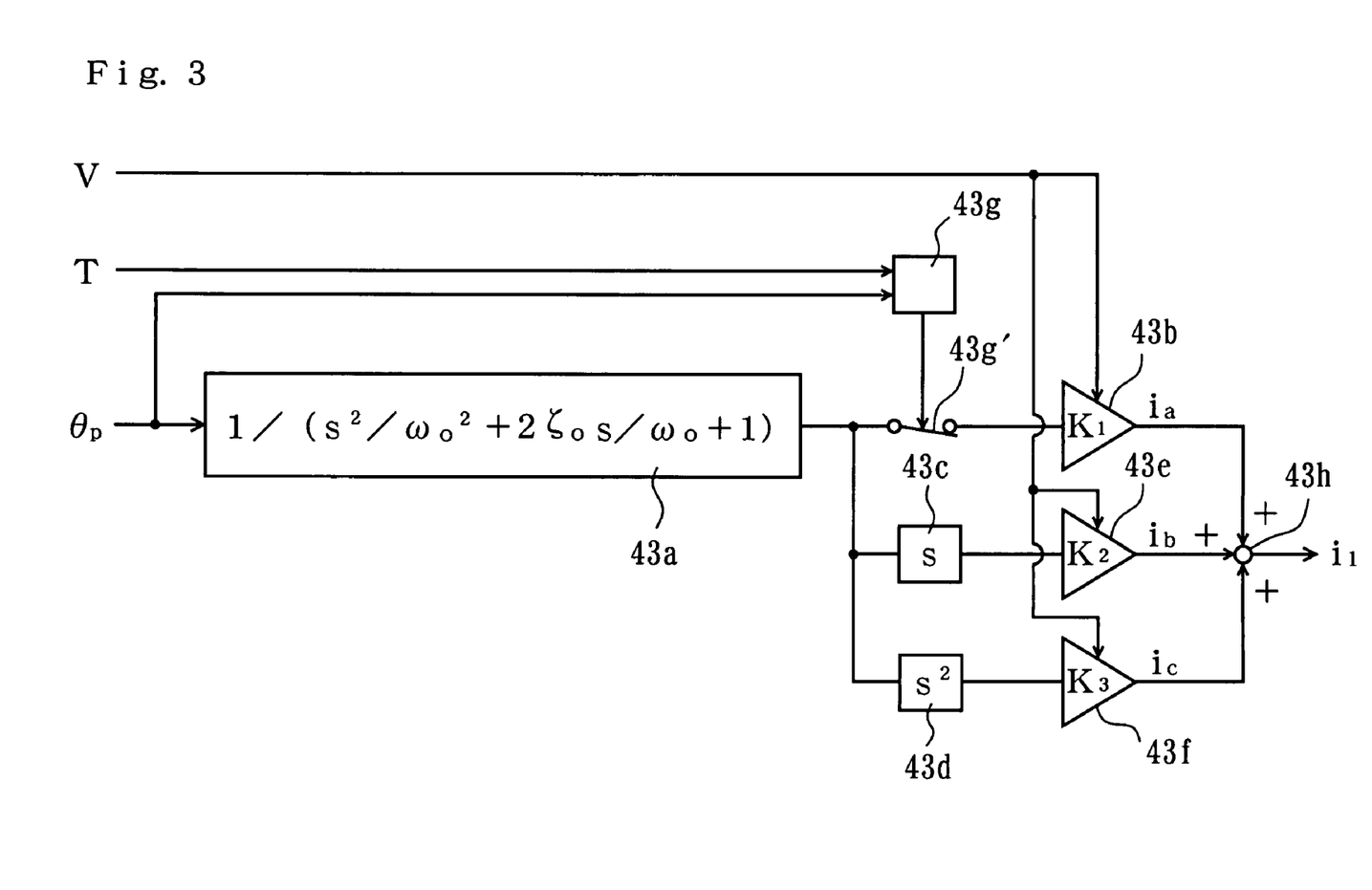
FIG. 3 is a control block diagram to determine the correction current in the electric power steering apparatus of the embodiment of the present invention.

FIGS. 2 and 3 show control block diagrams of the controller 20 for the motor 10.

As shown in FIG. 2, the controller 20 determines the target driving current i* of the motor 10 as the sum of the basic assist current $i_0$ and the correction current $i_1$ corresponding to the motor output correction value. The motor 10 is controlled by feedback control so that the deviation between the target driving current i* and the determined driving current i is reduced. As a result, the rotational angle $\theta_p$ of the pinion 5 is varied and the steering assist power is applied.

The relationship between the steering torque T and the basic assist current $i_0$ corresponding to the basic assist torque is stored as assist characteristic in the form of a table or calculation formula, and the basic assist current $i_0$ which corresponds to the determined steering torque T is calculated in the calculating part 41. As shown for example in the calculating part 41 of FIG. 2, the relationship between the steering torque T and the basic assist current $i_0$ is set so that the magnitude of the basic assist current $i_0$ increases as the magnitude of the steering torque T increases. The positive and negative signs of the steering torque T and basic assist current $i_0$ are reversed in the case of steering to the right and the case of steering to the left. The relationship between the steering torque T and the basic assist current $i_0$ can vary in accordance with the vehicle speed V; for example, the magnitude of the basic assist current $i_0$ is increased when the vehicle speed V is small in comparison to when the vehicle speed is large.

The relationship between the rotational angle $\theta_p$ of the pinion 5 and the correction current $i_1$ is stored as correction characteristic in the form of a table, calculation formula or the like, and the correction current $i_1$ corresponding to the determined rotational angle $\theta_p$ is calculated in the calculating part 43. The correction characteristic is set so that the denominator in the frequency transfer function G(s) of the correction current $i_1$ to the rotational angle $\theta_p$ has a term which includes the resonance angular frequency of the yaw motion of the vehicle, and a term which includes the damping ratio of the yaw motion of the vehicle.

Specifically, as shown in the block diagram in FIG. 3, the calculating part 43 has a vehicle characteristic setting element 43a, a return steering control gain setting element 43b, a differentiating element 43c, a second-order differentiating element 43d, a damping control gain setting element 43e, an inertia compensation control gain setting element 43f, a steering judgment element 43g, and an adding element 43h.

In the vehicle characteristic setting element 43a, the denominator in the frequency transfer function of the correction current $i_1$ to the rotational angle $\theta_p$ is set. In the present embodiment, the denominator is set as $(s^2/\omega_0^2 + 2\zeta_0 s/\omega_0 + 1)$, where $\omega_0$ is the resonance angular frequency of the yaw motion of the vehicle, $\zeta_0$ is the damping ratio of the yaw motion of the vehicle, and s is a Laplace operator. The resonance angular frequency $\omega_0$ and damping ratio $\zeta_0$ are functions of the vehicle speed V, and are determined for example by the following equations (1) and (2). In equations (1) and (2), L indicates the wheel base, m indicates the mass of the vehicle, $L_f$ indicates the distance between the front wheels and the center of gravity of the vehicle, $L_r$ indicates the distance between the rear wheels and the center of gravity of the vehicle, $I_z$ indicates the inertial moment of the vehicle, $K_f$ indicates the cornering power of the front wheels, and $K_r$ indicates the cornering power of the rear wheels.

$$\omega_0 = [2\{2L^2 K_f K_r/V^2 - m(L_f K_f - L_r K_r)\}/(mI_z)]^{1/2} \quad (1)$$

$$\zeta_0 = \{m(L_f^2 K_f + L_r^2 K_r) + I_z(K_f + K_r)\}/[2mI_z\{2L^2 K_f K_r - mV^2 (L_f K_f - L_r K_r)\}]^{1/2} \quad (2)$$

The numerator in the frequency transfer function G(s) includes the terms of $K_1\theta_p$, $K_2\theta_p s$ and $K_3\theta_p s^2$, where $K_1$ is the return steering control gain, $K_2$ is the damping control gain, and $K_3$ is the inertia compensation control gain.

Figure 4:
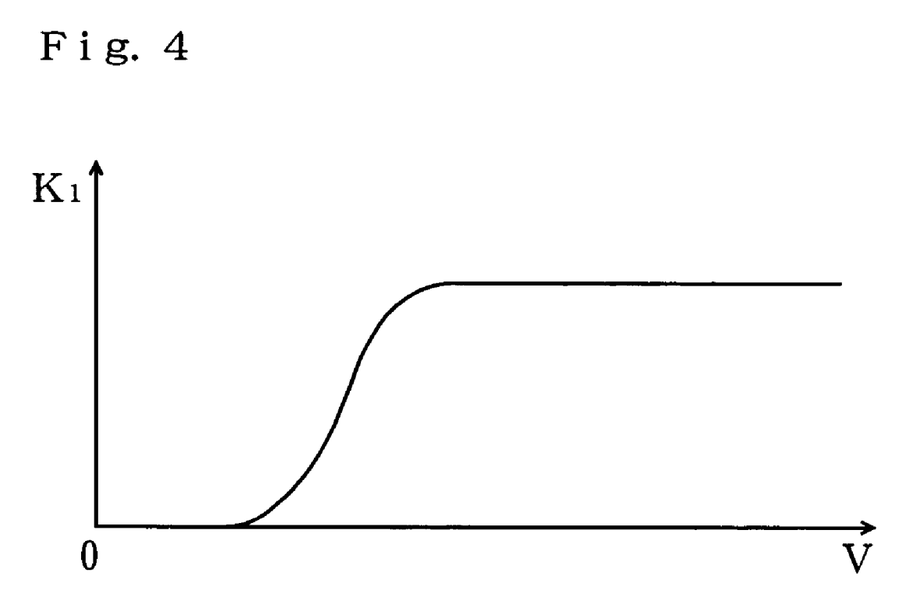
FIG. 4 is a graph showing the relationship between the return steering control gain $K_1$ and the vehicle speed V in the electric power steering apparatus of the embodiment of the present invention.

In the return steering gain setting element 43b, the return steering control gain $K_1$ is set as a positive value so that the steering assist power is larger in the return steering state than in the positive steering state, so that the steering assist power is set larger in cases where the absolute value of the rotational angle $\theta_p$ is large than in cases where this absolute value is small in the return steering state and hold steering state. As shown in FIG. 4, the return steering control gain $K_1$ in the return steering state is increased as the vehicle speed V increases. A judgment is made by the steering judgment element 43g as to whether the steering state is the return steering state or the positive steering state. The steering wheel 2 is steered in the direction toward a straight-forward steering position in the return steering state, and is steered in the direction away from the straight-forward steering position in the positive steering state. In the present embodiment, the positive and negative signs of the steering torque T are mutually opposite when the pinion 5 is in the right steering position and when the pinion 5 is in the left steering position, and the positive and negative signs of the rate of variation in the rotational angle $\theta_p$ are mutually opposite when the steering wheel 2 is rotated to the clockwise direction and when the steering wheel 2 is rotated to the counterclockwise direction, wherein it is judged to be the positive steering state when the sign of the steering torque T and the sign of the rate of variation in the rotational angle $\theta_p$ agree, and it is judged to be the return steering state when the two signs do not agree. In the positive steering state, the ordinarily-closed switch 43g' in the signal transmission path to the return steering control gain setting element 43b is opened, so that the return steering control gain $K_1$ is set at zero. As a result, the return steering control correction current $i_a$ which is expressed as $K_1\theta_p/(s^2/\omega_0^2 + 2\zeta_0 s/\omega_0 + 1)$ is determined, and this correction current $i_a$ becomes zero in the positive steering state.

Figure 5:
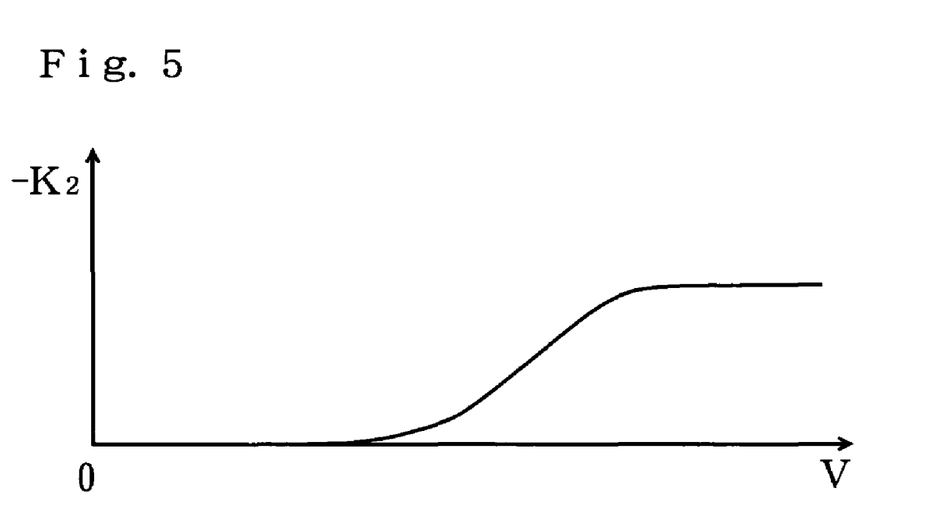
FIG. 5 is a graph showing the relationship between the damping control gain $K_2$ and the vehicle speed V in the electric power steering apparatus of the embodiment of the present invention.

In the damping control gain setting element 43e, the damping control gain $K_2$ is set as a negative value so that the steering assist power is attenuated in accordance with the rate of variation in the steering angle; here, the steering assist power is reduced as the rate of variation in the rotational angle $\theta_p$ determined by the differentiating element 43c increases. For example, as shown in FIG. 5, the absolute value of the damping control gain $K_2$ is increased as the vehicle speed V increases. As a result, the damping control correction current $i_b$ which is expressed as $K_2\theta_p s/(s^2/\omega_0^2 + 2\zeta_0 s/\omega_0 + 1)$ is determined.

Figure 6:
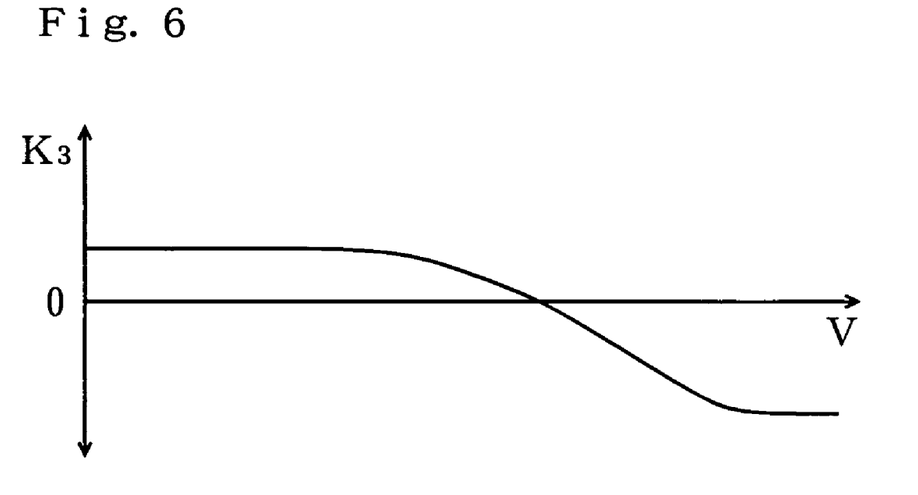
FIG. 6 is a graph showing the relationship between the inertia compensation control gain $K_3$ and the vehicle speed V in the electric power steering apparatus of the embodiment of the present invention.

In the inertia compensation control gain setting element 43f, the inertia compensation control gain $K_3$ is set as a positive value so that the steering assist power is caused to vary in accordance with the acceleration of the variation in the steering angle. The steering assist power is increased with the increase in the acceleration of the variation in the rotational angle $\theta_p$ determined in the second-order differentiating element 43d. For example, as shown in FIG. 6, the inertia compensation control gain $K_3$ is decreased with the increase in the vehicle speed V. As a result, the inertia compensation control correction current $i_c$ which is expressed as $K_3\theta_p s^2/(s^2/\omega_0^2 + 2\zeta_0 s/\omega_0 + 1)$ is determined.

In the adding element 43h, the correction current $i_1$ is determined by adding up the respective correction currents $i_a$, $i_b$ and $i_c$. As a result, in the present embodiment, the frequency transfer function G(s) is determined by the following equation.

$$G(s) = (K_1\theta_p + K_2\theta_p s + K_3\theta_p s^2)/(s^2/\omega_0^2 + 2\zeta_0 s/\omega_0 + 1)$$

As shown in FIG. 2, the controller 20 determines the target driving current i* as the sum of the determined basic assist current $i_0$ and correction current $i_1$ in the adding part 45. The motor 10 is controlled by feedback control so that the deviation between the target driving current i* and the driving current i determined by the current sensor 26 is reduced, whereby the output of the motor 10 required in order to generate the basic assist torque is corrected in accordance with the correction current $i_1$.

In order to set the correction characteristic of the output of the motor 10 so that the steering characteristic is optimized, it is desirable to minimize the effect of the vehicle behavior due to the variation in the steering angle. Since the yaw motion of the vehicle is generated on the basis of the axial force which acts on the vehicle wheels used for steering in accordance with the variation in the steering angle, such vehicle behavior to the variation in the steering angle can be expressed by a frequency transfer function of the axial force correspondence value acting on the vehicle wheels 3 used for steering to the rotational angle $\theta_p$. The denominator in the frequency transfer function of the axial force correspondence value acting on the vehicle wheels 3 used for steering to the rotational angle $\theta_p$ can be set so that the denominator has a term including the resonance angular frequency $\omega_0$ of the yaw motion of the vehicle, and a term including the damping ratio $\zeta_0$. In the abovementioned embodiment, the denominator in the frequency transfer function of the correction current $i_1$ to the rotational angle $\theta_p$ is set so that this denominator has a term which includes the resonance angular frequency $\omega_0$ of the yaw motion of the vehicle, and a term that includes the damping ratio $\zeta_0$. Accordingly, this denominator can be set so as to agree with the denominator in the frequency transfer function of the axial force correspondence value which acts on the vehicle wheels 3 used for steering to the rotational angle $\theta_p$.

The axial force correspondence value can be the axial force acting on the vehicle wheels 3, the yaw rate of the vehicle, the lateral acceleration of the vehicle or the like. In any case, the frequency transfer function of the axial force correspondence value to the rotational angle $\theta_p$ can be set as a common frequency transfer function in which the denominator has a term which includes the resonance angular frequency coo and a term which includes the damping ratio $\zeta_0$.

For example, the frequency transfer function of the axial force F acting on the vehicle wheels 3 used for steering to the rotational angle $\theta_p$ can be expressed by the following equation with $a_0$, $a_1$ and $a_2$ as constants.

$$F/\theta_p = (a_2 s^2 + a_1 s + a_0)/(s^2/\omega_0^2 + 2\zeta_0 s/\omega_0 + 1)$$

The frequency transfer function of the yaw rate γ of the vehicle to the rotational angle $\theta_p$ can be expressed by the following equation with $b_0$ and $b_1$ as constants.

$$\gamma/\theta_p = (b_1 s + b_0)/(s^2/\omega_0^2 + 2\zeta_0 s/\omega_0 + 1)$$

The frequency transfer function of the lateral acceleration $G_Y$ of the vehicle to the rotational angle $\theta_p$ can be expressed by the following equation with $c_0$, $c_1$ and $c_2$ as constants.

$$G_Y/\theta_p=(c_2s^2+c_1s+c_0)/(s^2/\omega_0^2+2\zeta_0 s/\omega_0+1)$$

As a result, the effect of the vehicle behavior caused by the variation in the steering angle on the correction characteristic of the output of the motor 10 can be reduced merely by varying the coefficients of the terms of the numerator in the frequency transfer function G(s). Accordingly, the design of the control system for optimizing the steering characteristic can easily be performed with using the frequency response; furthermore, since all of the terms in the numerator can be manipulated, the degree of freedom in design is also increased.

Figure 7:
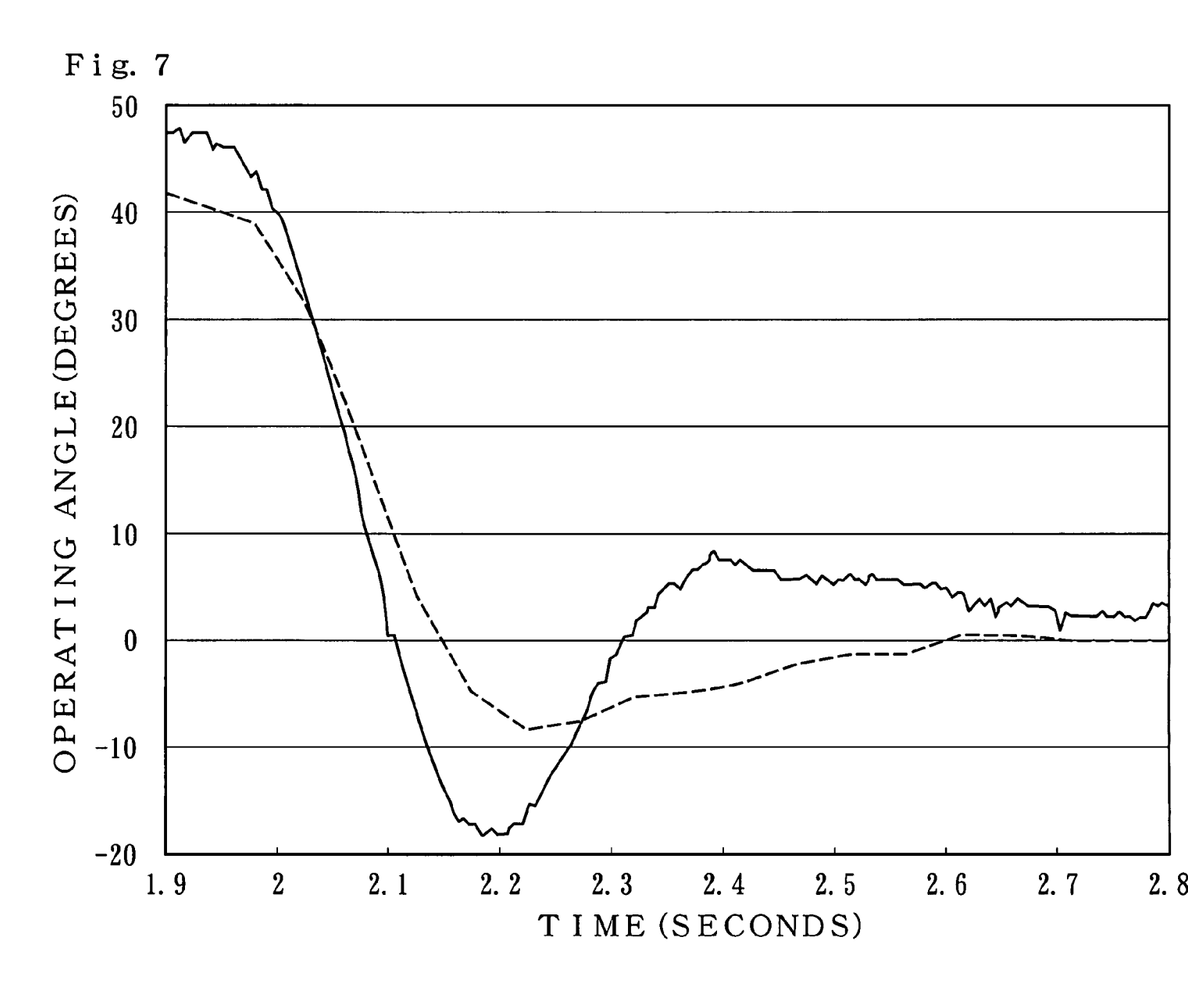
FIG. 7 is a graph showing an example of the relationship between the presence or absence of motor output correction, the operating angle of the steering wheel, and time in the electric power steering apparatus of the embodiment of the present invention.

FIG. 7 shows the convergence of the steering wheel 2 of a vehicle moving at 100 km/hour, that is to say, indicates one example of the relationship between the time (seconds) required for the steering wheel 2 in a released state to return to the straight-forward position and the operating angle (degrees) of the steering wheel 2. The characteristic in a case where the control for correcting the output of the motor 10 is not performed is indicated by the solid line in the figure, and the characteristic in a case where the control according to the abovementioned embodiment is performed is indicated by the broken line in the figure. It can be confirmed from this figure that the convergence of the steering wheel 2 is improved by performing the control for correcting the output of the motor 10.

The present invention is not limited to the abovementioned embodiment. For example, the steering angle correspondence value is not limited to the rotational angle $\theta_p$ of the pinion 5, but can be any value whose amount of variation corresponds to the amount of variation in the steering angle, and can thus be the rotational angle of the steering wheel 2, the rotational angle of the output shaft of the motor 20, the amount of movement of the rack 6 or the like. Furthermore, the correction characteristic in the abovementioned embodiment is set so that the return steering control, damping control and inertia compensation control are performed. Alternatively, the numerator in the frequency transfer function G(s) can include at least one term among the terms $K_1\theta_p$, $K_2\theta_p s$ and $k_3\theta_p s^2$ so that at least one type of control among these types of control is performed, or other type of control for optimizing the steering characteristic can be performed. Furthermore, the mechanism whereby the rotation of the steering wheel is transmitted to the vehicle wheels so that the steering angle varies is not limited to the mechanism of the present embodiment, but can also be a mechanism which is such that the rotation of the steering wheel is transmitted to the vehicle wheels from the steering shaft by a link mechanism other than a rack and pinion. Furthermore, as long as the transmission mechanism which transmits the output of the motor for generating the steering assist power to the steering system is capable of applying steering assist power, this mechanism is not limited to the mechanism of the present embodiment; for example, the steering assist power can also be applied by driving a ball nut engaged with a ball screw integrated with the rack by the output of the motor.

What is claimed is:

1. An electric power steering apparatus for a vehicle comprising:

a motor for generating steering assist power;

a torque determination part for determining steering torque;

a storing part for storing a relationship between the steering torque and basic assist torque, in which the relationship is stored as assist characteristic;

a steering angle correspondence value determination part for determining steering angle correspondence value corresponding to steering angle of the vehicle;

a storing part for storing a relationship between the steering angle correspondence value and motor output correction value, in which the relationship is stored as correction characteristic; and a correcting part for correcting the output of the motor, which is required in order to generate the basic assist torque, in accordance with the motor output correction value determined on the basis of the determined steering angle correspondence value and said correction characteristic, in which the basic assist torque is determined on the basis of the determined steering torque and said assist characteristic;

wherein said correction characteristic is set so that the denominator in the frequency transfer function of the motor output correction value to the steering angle correspondence value has a term which includes the resonance angular frequency of the yaw motion of the vehicle, and a term which includes the damping ratio of the yaw motion of the vehicle.

2. The electric power steering apparatus according to claim 1, wherein the numerator in the frequency transfer function of the motor output correction value to the steering angle correspondence value includes at least one term among the terms $K_1\theta_p$, $K_2\theta_p s$ and $K_3\theta_p s^2$, where $K_1$ is a return steering control gain, $K_2$ is a damping control gain, $K_3$ is an inertia compensation control gain, $\theta_p$ is the steering angle correspondence value, and s is a Laplace operator, said return steering control gain $K_1$ is set so that the steering assist power is greater in a return steering state than in a positive steering state, said damping control gain $K_2$ is set so that the steering assist power is attenuated in accordance with the rate of variation in the steering angle, and said inertia compensation control gain $K_3$ is set so that the steering assist power is varied in accordance with the acceleration of the variation in the steering angle.

* * * * *